United States Patent
Marcial-Simon et al.

(10) Patent No.: US 10,696,173 B2
(45) Date of Patent: Jun. 30, 2020

(54) METHOD FOR OPERATING A SYSTEM FOR SUPPLYING A VEHICLE WITH ELECTRICAL ENERGY AND SYSTEM

(71) Applicant: Bayerische Motoren Werke Aktiengesellschaft, Munich (DE)

(72) Inventors: Enrique Marcial-Simon, Veitshoechheim (DE); Jens Berger, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 67 days.

(21) Appl. No.: 15/965,591

(22) Filed: Apr. 27, 2018

(65) Prior Publication Data

US 2018/0244162 A1 Aug. 30, 2018

Related U.S. Application Data

(63) Continuation of application No. PCT/EP2016/070294, filed on Aug. 29, 2016.

(30) Foreign Application Priority Data

Oct. 29, 2015 (DE) .......... 10 2015 221 171

(51) Int. Cl.
*H02J 7/00* (2006.01)
*B60L 11/18* (2006.01)
*B60L 53/64* (2019.01)

(52) U.S. Cl.
CPC ............ *B60L 11/184* (2013.01); *B60L 53/64* (2019.02); *H02J 7/0027* (2013.01);
(Continued)

(58) Field of Classification Search
CPC .................................................. H02J 7/0027
(Continued)

(56) References Cited

U.S. PATENT DOCUMENTS

2013/0020992 A1 1/2013 Wu et al.
2014/0028681 A1 1/2014 Hirayama
(Continued)

FOREIGN PATENT DOCUMENTS

DE 10 2008 037 575 A1 7/2010
DE 10 2013 002 078 A1 8/2013
(Continued)

OTHER PUBLICATIONS

Velarde, "Aufbau und Adaptierung eines Gateways zur Kommunikation zwischen Simulation und Hausenergiemanagementgeraet Buildup and Adaption of a Software Communication between Simulation and Home Energy Manager", Aug. 1, 2014, pp. 1-71, XP055316356, Madrid, Spain.
(Continued)

*Primary Examiner* — Edward Tso
*Assistant Examiner* — Ahmed H Omar
(74) *Attorney, Agent, or Firm* — Crowell & Moring LLP (57) ABSTRACT

A method for operating a system for supplying a vehicle with electrical energy, wherein the system has a charging station, an energy management unit and a translation unit. The translation unit has a first communications interface for communicating with the energy management unit, and a second communications interface which can be coupled for communication with the vehicle. In the event that the vehicle is coupled with the second communications interface, the system provides a minimum power parameter representative of a minimum electrical power that is to be supplied to the vehicle. A first evaluation matrix is provided to the translation unit via the first communications interface, which includes a first evaluation parameter for each future first time period and for each first power stage of electrical power to be supplied via the system. The evaluation parameter is representative of an output associated with a supply of the
(Continued)

respective electrical power for each first time period. Depending on the minimum power parameter and the first evaluation matrix, a second evaluation matrix is determined by the translation unit, which is representative of an estimation of the output. The second evaluation matrix is provided to the vehicle via the second communications interface.

16 Claims, 3 Drawing Sheets

(52) U.S. Cl.
CPC ....... *H02J 7/00036* (2020.01); *Y02T 10/7005* (2013.01); *Y02T 10/7055* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
USPC .......................................................... 320/109
See application file for complete search history.

(56) References Cited

U.S. PATENT DOCUMENTS

2014/0062401 A1   3/2014   Gadh et al.
2014/0142774 A1   5/2014   Katayama et al.
2014/0249976 A1   9/2014   Sugimura et al.

FOREIGN PATENT DOCUMENTS

| DE | 102013002078 A1 * | 8/2013 | .......... B60L 11/1816 |
| DE | 10 2013 212 219 A1 | 12/2014 | |
| EP | 2 505 421 A2 | 10/2012 | |

OTHER PUBLICATIONS

German Search Report issued in counterpart German Application No. 10 2015 221 171.1 dated Apr. 25, 2016 with partial English-language translation (Seventeen (17) pages).

Shimizu et al., "Smart Charging System for PEV Based on SEP 2.0 and SAE Standards", 2014 IEEE International Conference on Smart Grid Communications (SmartGridComm), Venice, 2014, pp. 692-697.

International Search Report (PCT/ISA/210) issued in PCT Application No. PCT/EP2016/070294 dated Nov. 11, 2016 with English-language translation (Seven (7) pages).

Japanese-language Written Opinion (PCT/ISA/237) issued in PCT Application No. PCT/EP2016/070294 dated Nov. 11, 2016 (Six (6) pages).

German-language Search Report issued in counterpart German Application No. 10 2016 221 335.0 dated Oct. 21, 2019 with partial English translation (13 pages).

* cited by examiner

|    | t0 | t1 | t2 | t3 | t4 | t5 | t6 | t7 |
|----|----|----|----|----|----|----|----|----|
| P3 | K  | K  | K  | K  | K  | K  | K  | K  |
| P2 | K  | K  | K  | K  | K  | K  | K  | K  |
| P1 | K  | K  | K  | K  | K  | K  | K  | K  |
| P0 | K  | K  | K  | K  | K  | K  | K  | K  |

KM'

|     | t0' | t1' | t2' |
|-----|-----|-----|-----|
| P2' | K'  | K'  | K'  |
| P1' | K'  | K'  | K'  |
| P0' | K'  | K'  | K'  | form
METHOD FOR OPERATING A SYSTEM FOR SUPPLYING A VEHICLE WITH ELECTRICAL ENERGY AND SYSTEM

CROSS REFERENCE TO RELATED APPLICATIONS

This application is a continuation of PCT International Application No. PCT/EP2016/070294, filed Aug. 29, 2016, which claims priority under 35 U.S.C. § 119 from German Patent Application No. 10 2015 221 171.1, filed Oct. 29, 2015, the entire disclosures of which are herein expressly incorporated by reference.

BACKGROUND AND SUMMARY OF THE INVENTION

The invention relates to a method for operating a system for supplying a vehicle with electrical energy, as well as a system for supplying a vehicle with electrical energy.

The object on which the invention is based is to provide a method for operating a system for supplying a vehicle with electrical energy and to provide a corresponding system which enables particularly efficient supply with electrical energy.

According to a first aspect, the invention relates to a method for operating a system for supplying a vehicle with electrical energy. The system comprises a charging station, an energy management unit and a translation unit. The translation unit has a first communication interface for communicating with the energy management unit and a second communication interface which can be coupled to the vehicle for the purpose of communication.

If the vehicle is coupled to the second communication interface, the system is provided with a minimum power characteristic value which is representative of a minimum electrical power to be supplied to the vehicle.

The translation unit is provided, via the first communication interface, with a first assessment matrix which comprises a first assessment characteristic value for each period of future first periods and for each power level of first power levels of electrical power to be supplied by the system. The assessment characteristic value is representative of an outlay associated with supplying the respective electrical power for the respective first period.

The translation unit determines a second assessment matrix, which is representative of an estimate of the outlay, on the basis of the minimum power characteristic value and the first assessment matrix. The vehicle is provided with the second assessment matrix via the second communication interface.

Such a method advantageously makes it possible to efficiently supply the vehicle with electrical energy.

The second assessment matrix comprises, in particular, a second assessment characteristic value for a respective period of future second periods and for a respective power level of second power levels of electrical power to be supplied by the system. The second assessment characteristic value is representative, in particular, of an estimate of an outlay associated with supplying the respective electrical power for the respective second period.

In this case, the system is designed, in particular, to charge an energy store of a vehicle. In this case, the vehicle can determine, for example, a supply plan, which is representative of the electrical power to be supplied by the system with respect to the second periods, on the basis of the second assessment matrix. In other words, the vehicle can select respective second power levels, at which electrical power is supplied, on the basis of the individual second assessment characteristic values in the various second periods. Likely drops in power in solar installations, for example due to reduced solar radiation, can therefore be advantageously taken into account when supplying the vehicle with electrical energy.

In this case, the first assessment matrix is representative of a likely outlay associated with supplying the electrical power of the respective first power level in the respective future first period. For example, this may be an expected $CO_2$ emission produced in connection with providing the electrical power, or costs which are charged by a network operator for this. Alternatively or additionally, the outlay may also be representative of a proportion of renewable energy in the electrical energy to be fed in.

The first assessment matrix may comprise, for example, a predefined first maximum power level number of first power levels and/or a predefined first maximum period number of first periods, in which case the first assessment matrix can be transmitted via the first communication interface, in particular.

The second assessment matrix may also comprise, for example, a predefined second maximum power level number of second power levels and/or a predefined second maximum period number of second periods, in which case the second assessment matrix can be transmitted via the second communication interface, in particular.

The predefined first maximum power level number may differ in this case from the predefined second maximum power level number and/or the predefined first maximum period number may differ from the predefined second maximum period number in such a manner that transmission of the first assessment matrix via the second communication interface results in errors or is impossible.

For example, the predefined first maximum power level number of the first assessment matrix is four or more, but the predefined second maximum power level number of the second assessment matrix is only three. In a manner differing from this, the respective maximum power level number may also assume larger or smaller values. For example, the respective maximum power level number and/or the respective maximum period number is/are predefined in a protocol used by the respective communication interface. Consequently, it may be necessary for the translation unit to translate the individual assessment characteristic values. In particular, an outlay specified in absolute terms may be converted in this case into a relative outlay, for example with respect to a maximum outlay.

In one advantageous configuration according to the first aspect, a process of determining the second assessment matrix comprises a process of determining a temporary matrix.

A lowest power level of the temporary matrix is determined on the basis of the minimum power characteristic value. For each period of the first assessment matrix, a respective entry in the temporary matrix for the lowest power level is determined on the basis of the first assessment characteristic values of all first power levels below the minimum power characteristic value of the respective first period.

The first assessment matrix can be advantageously converted to the second assessment matrix in a particularly efficient manner by combining the first power levels below the minimum power characteristic value.

In another advantageous configuration according to the first aspect, the system is provided with a maximum power characteristic value which is representative of a maximum electrical power which can be received by the vehicle.

A highest power level of the temporary matrix is determined on the basis of the maximum power characteristic value. For each first period of the first assessment matrix, a respective entry in the temporary matrix for the highest power level is determined on the basis of the first assessment characteristic values of all first power levels above the maximum power characteristic value of the respective first period.

The first assessment matrix can be advantageously converted to the second assessment matrix in a particularly efficient manner by combining the first power levels above the maximum power characteristic value.

In another advantageous configuration according to the first aspect, respectively adjacent entries in the temporary matrix are iteratively combined in blocks until a first and/or a second abort criterion is/are reached.

Combining the adjacent entries in the temporary matrix advantageously makes it possible to achieve the second maximum power level number and/or the second maximum period number and to determine a good estimate of the outlay. Undershooting of the second maximum power level number, for example, is used as a first abort criterion. Undershooting of the second maximum period number, for example, is used as a second abort criterion.

In another advantageous configuration according to the first aspect, the translation unit is provided with a maximum power level characteristic value.

For each iteration, a check is carried out, as a first abort criterion, in order to determine whether a number of power levels for each period is less than or equal to the maximum power level characteristic value. Otherwise, a respective mean value is formed for each combinable block with respect to a period of adjacent entries in the temporary matrix.

A lowest mean value is determined for each iteration. The block of entries in the temporary matrix corresponding to the respective lowest mean value is combined by replacing the entries in the temporary matrix which are assigned to the block with a single entry comprising the respective lowest mean value.

This advantageously makes it possible to adapt the second assessment matrix particularly well to the second communication interface, with the result that the vehicle can determine, from the second assessment matrix, a charging profile which corresponds substantially to a charging profile determined with knowledge of the first assessment matrix. Consequently, the vehicle can be supplied with electrical energy in a particularly efficient manner.

The maximum power level characteristic value is, in particular, representative of the second maximum power level number mentioned above.

In another advantageous configuration according to the first aspect, the translation unit is provided with a maximum period characteristic value.

For each iteration, a check is carried out, as a second abort criterion, in order to determine whether a number of periods for each power level is less than or equal to the maximum period characteristic value. Otherwise, a respective mean value is formed for each combinable block with respect to a power level of adjacent entries in the temporary matrix.

A lowest mean value is determined for each iteration. The block of entries in the temporary matrix corresponding to the respective lowest mean value is combined by replacing the entries in the temporary matrix which are assigned to the block with a single entry comprising the respective lowest mean value.

This advantageously makes it possible to adapt the second assessment matrix particularly well to the second communication interface, with the result that the vehicle can determine, from the second assessment matrix, a charging profile which corresponds substantially to a charging profile determined with knowledge of the first assessment matrix. Consequently, the vehicle can be supplied with electrical energy in a particularly efficient manner.

The maximum period characteristic value is representative, in particular, of the second maximum period number mentioned above.

In another advantageous configuration according to the first aspect, the first communication interface is operated according to the SEMP protocol ("Simple Energy Management Protocol"). This is a protocol from SMA Solar Technology AG which is currently available in edition 1.0.6 dated Aug. 14, 2015 (SEMP-11:ZE3315). With regard to the specifications for this, reference is made to the so-called "SEMP Application Note Electric Vehicle via price- and power-tables" in edition 0.1.0 (SEMPANEV-010:FE3614), likewise from SMA Solar Technology AG.

In these documents, the energy management unit mentioned above is also specified, in particular, in more detail as a so-called "Energy Manager" or so-called "Energy Management", EM for short.

In another advantageous configuration according to the first aspect, the second communication interface is operated according to the protocol in accordance with ISO15118-2: 2014. This is, in particular, the version dated Apr. 1, 2014 with the title "Road vehicles-Vehicle-to-Grid Communication Interface—Part 2: Network and application protocol requirements" from the International Organization for Standardization (ISO).

According to a second aspect, the invention relates to a system for supplying a vehicle with electrical energy. The system comprises a charging station having a first energy interface which can be coupled to the vehicle for the purpose of supplying the latter with electrical energy. The system also comprises an energy management unit having a second energy interface for supplying the charging station with electrical energy. The system also comprises a translation unit having a first communication interface for communicating with the energy management unit and a second communication interface which can be coupled to the vehicle for the purpose of communication. The system is designed to carry out a method according to the first aspect.

In one advantageous configuration according to the second aspect, the energy management unit is in the form of a home energy management system.

The vehicle can be advantageously supplied with electrical energy in a decentralized manner, in particular independently of a central power supply system. This contributes to a particularly large proportion of renewable energies being able to be used to supply the vehicle. The home energy management system can also be referred to as HEMS. This is, in particular, the energy management unit which is specified in the SEMP documents mentioned above and is connected to a gateway in the home. The device which communicates with other components and undertakes intelligent energy control and/or distribution is associated with the home energy management system.

In another advantageous configuration according to the second aspect, the energy management unit is assigned a decentralized energy supply unit and/or a stationary energy store.

The decentralized energy supply unit may be, in particular, in the form of a decentralized solar installation (so-called PV installation).

Other objects, advantages and novel features of the present invention will become apparent from the following detailed description of one or more preferred embodiments when considered in conjunction with the accompanying drawings.

BRIEF DESCRIPTION OF THE DRAWINGS

Elements of identical design or function are provided with the same reference symbols throughout the figures.

DETAILED DESCRIPTION OF THE DRAWINGS

The falling acquisition costs of decentralized solar installations (PV installations) combined with the falling subsidies for feeding in solar power increase the incentive for the private consumption of solar power generated in a decentralized manner. Private consumption can be optimized in a networked home having a PV installation and a stationary energy store with intelligent energy management by means of a home energy management system (HEMS). The better the private consumption can be adapted, the lower the grid purchases.

A vehicle, in particular an electric vehicle, can be charged at such a home. In this case, an outlay associated with supplying electrical energy is intended to be kept as low as possible. For example, a supply of energy locally provided by the PV installation is appropriate. This advantageously makes it possible to keep a CO2 emission associated with providing the electrical energy low. In this context, the outlay may describe, for example, costs of a monetary nature and/or a CO2 emission which is caused and/or a proportion of renewable energies.

For this purpose, the vehicle can obtain tariff information from the home energy management system, for example. In this case, the home energy management system communicates via an application protocol such as SEMP, for example. The vehicle communicates, for example, by means of a protocol which differs from the application protocol. For example, the vehicle masters only the ISO standard ISO15118-2:2014. In this context, it may be necessary to translate between the protocols. A translation unit (so-called "gateway") which is installed, for example, in a charging station, such as a so-called "EV wall box", is provided for the communication between the vehicle and the home energy management system.

In this context, an estimate of the outlay associated with supplying electrical energy is a challenge during translation. In particular, the estimate is intended to ensure that the vehicle can determine a charging profile associated with an outlay which is as low as possible. In particular, data should be transmitted in this case while complying with the respective protocol specifications.

In other words, translation which is as intelligent as possible and which enables the vehicle to determine a charging profile which has as little outlay as possible or is as cost-effective as possible should be specified.

Figure 1:
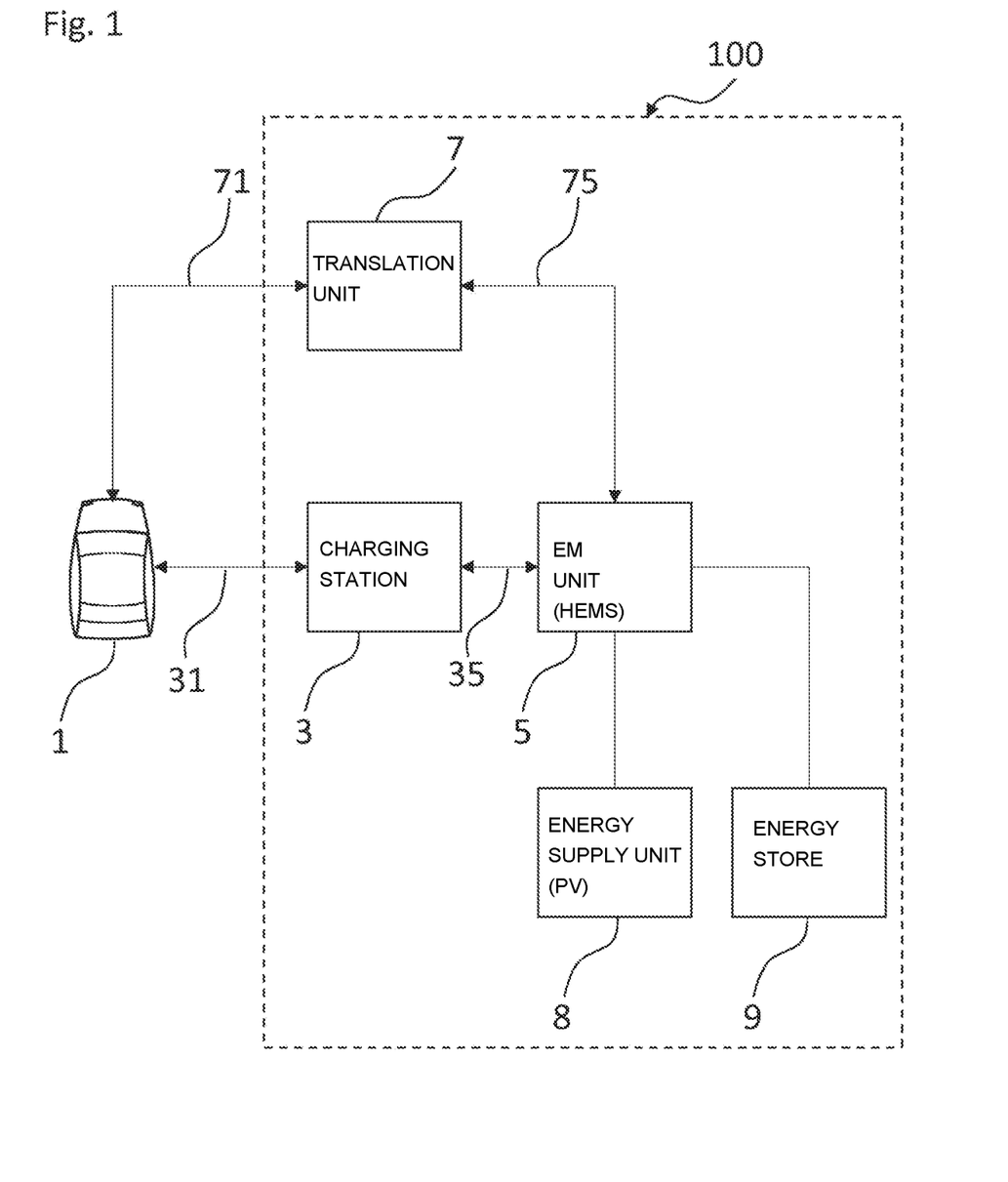
FIG. 1 shows a system for supplying a vehicle with electrical energy.

FIG. 1 shows a system 100 for supplying a vehicle 1 with electrical energy. The system 100 comprises a charging station 3, an energy management unit 5 and a translation unit 7.

The charging station 3 is, for example, a so-called "wall box" for electric vehicles. The translation unit 7 may form a structural unit with the charging station 3, for example, or may be separate from the latter.

The charging station 3 has a first energy interface 31 and a second energy interface 35. In this case, the first energy interface 31 is used to supply the vehicle with electrical energy. For this purpose, the charging station 3 can be coupled to the vehicle 1 via the first energy interface 31.

The second energy interface 35 is used to supply the charging station 3 with electrical energy. For this purpose, the charging station 3 is coupled to the energy management unit 5, in particular, via the second energy interface 35.

The translation unit 7 has a first communication interface 75 and a second communication interface 71. In this case, the first communication interface 75 is used to communicate with the energy management unit 5. For this purpose, the translation unit 7 is coupled to the energy management unit 5, in particular, via the first communication interface 75.

The second communication interface 71 is used to communicate with the vehicle 1. For this purpose, the translation unit 7 can be coupled to the vehicle 1, in particular, via the second communication interface 71.

The energy management unit 5 is, in particular, a home energy management system (HEMS), preferably a HEMS from SMA Solar Technology AG. In this case, the energy management unit 5 may be assigned an energy supply unit 8, such as a decentralized solar installation (PV installation), and/or a stationary energy store 9, such as a battery. The system 100, in particular the energy management unit 5, additionally has a grid connection (not illustrated in any more detail), for example, via which energy can be obtained from a central power supply system.

The first communication interface 75 is operated, in particular, according to a first protocol which differs from a second protocol, according to which the second communication interface 71 is operated. In this exemplary embodiment, the first protocol is, for example, the protocol according to ISO15118-2:2014 mentioned in the summary part of the description. In further exemplary embodiments, the first protocol may be another protocol. In this exemplary embodiment, the second protocol is furthermore the SEMP protocol mentioned in the summary part of the description, for example. In further exemplary embodiments, the second protocol may be another protocol.

The system 100, in particular the translation unit 7, is assigned a control apparatus (not illustrated in any more detail). The latter comprises a data and program memory which stores a program which is explained in more detail below on the basis of the flowchart in FIG. 2.

Figure 2:
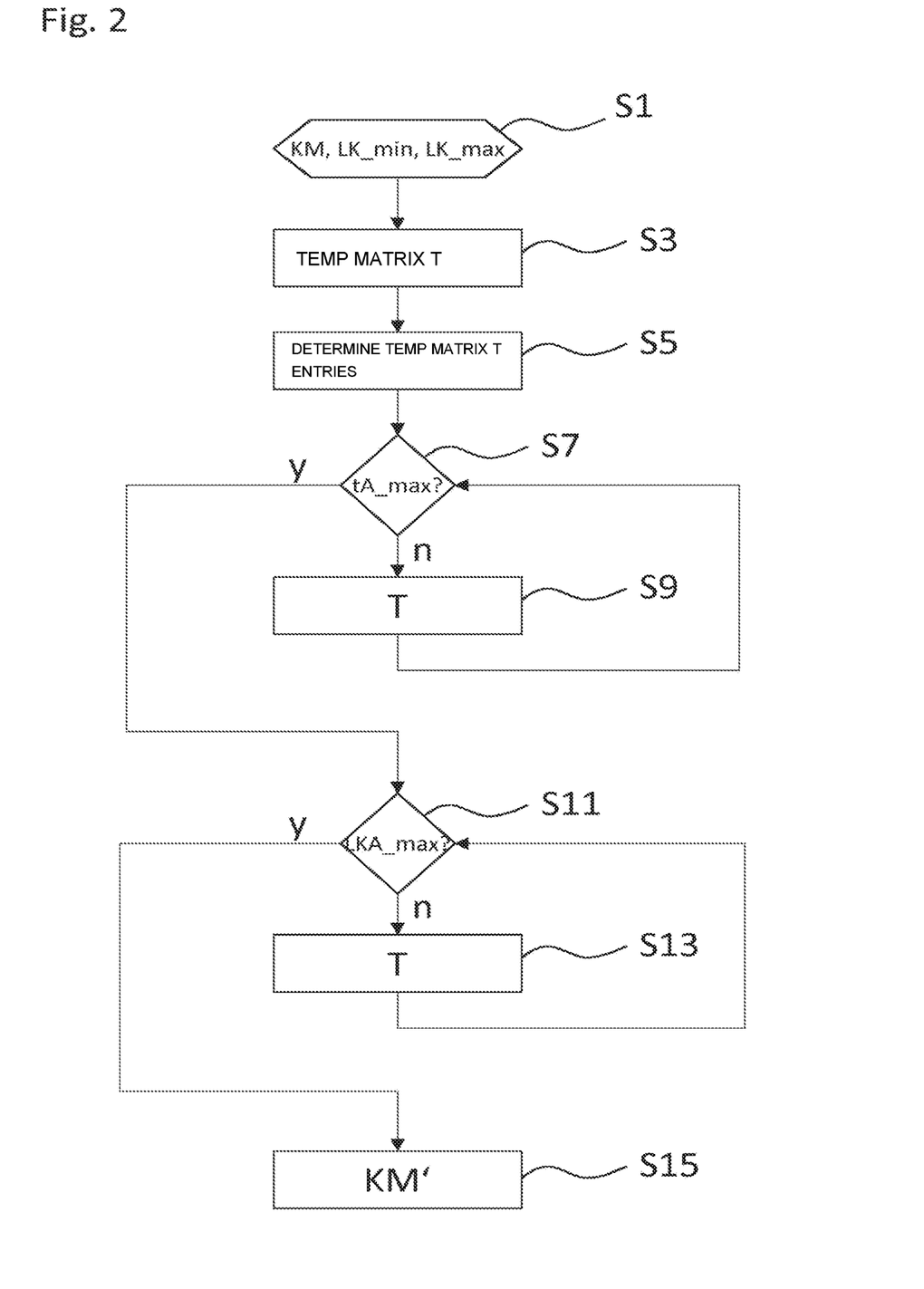
FIG. 2 shows a flowchart for operating the system according to FIG. 1.

For example, the program is started when the vehicle 1 is coupled to the charging station 3, in particular via the second communication interface 71. The program is started in a step S1 in which variables are initialized, for example.

In particular, a minimum power characteristic value LK_min, a maximum power characteristic value LK_max, a first assessment matrix KM, a maximum power level characteristic value LKA_max and a maximum period characteristic value tA_max are provided in step S1.

In this case, the vehicle 1, for example, transmits the minimum power characteristic value LK_min and/or the maximum power characteristic value LK_max, which represent an electrical power to be supplied at least or at most to the vehicle, to the translation unit 7.

The maximum power level characteristic value LKA_max and the maximum period characteristic value tA_max are assigned to the second communication interface 71, for example, and can be stored in the translation unit 7 and/or can be provided by the vehicle 1, the maximum power level characteristic value LKA_max representing a second maximum power level number predefined by the second protocol, and the maximum period characteristic value tA_max accordingly representing a second maximum period number predefined by the second protocol.

The first assessment matrix KM is provided, for example, by a grid operator via the energy management unit 5 or is directly determined by the energy management unit 5.

The first assessment matrix KM (FIG. 3) comprises, for example, first assessment characteristic values K which are arranged in rows and columns and are representative of an outlay which is associated with supplying electrical power and is also referred to as "costs" below. In this context, the term "favorable" may also represent a process of providing electrical energy with little outlay. In this exemplary embodiment, the rows of the first assessment matrix are representative of a first power level P0, P1, P2, P3 of the electrical power to be supplied, and the columns are representative of a first period t0, t1, t2, t3, t4, t5, t6, t7 in which the corresponding electrical power is supplied.

Figure 3:
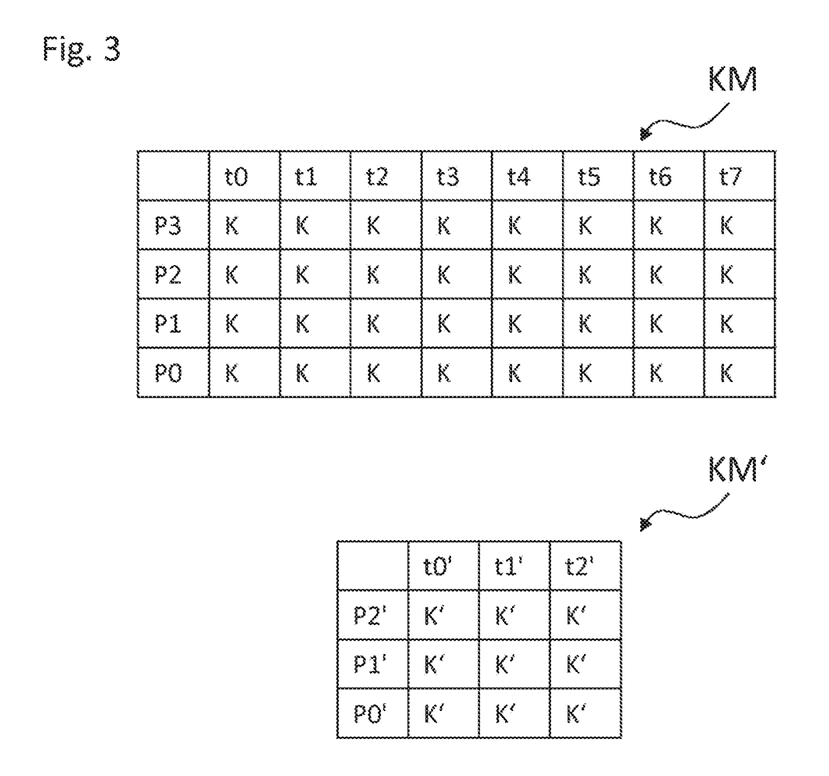
FIG. 3 shows an exemplary first and second assessment matrix.

In the subsequent program steps, a translation is carried out on the basis of the first assessment matrix KM and is such that it combines power blocks, that is to say entries in the first assessment matrix KM which are adjacent based on the first power levels P0, . . . , P3, together with costs below the minimum power characteristic value LK_min of the vehicle 1, and suitably extrapolates the costs to a second power level P0' of a second assessment matrix KM' (FIG. 3). The second power level P0' in this case represents the minimum power to be supplied to the vehicle 1, for example.

Absolute costs of respective power blocks, that is to say the first assessment characteristic values K, are transmitted using the SEMP protocol, for example. In contrast to the ISO protocol, however, the costs do not relate to a full power above 0 W, but rather above a previous limit or adjacent power level. For translation, the absolute assessment characteristic values K must be translated into relative costs in percent, for example in relation to expected maximum costs, according to ISO.

In particular, the translation takes into account cost differences in the lower power spectrum, as is represented on the basis of the following excerpt from an exemplary assessment matrix KM

| KM | t0<br>00:00–01:00 | t1<br>01:00–02:00 | t2<br>02:00–03:00 |
|---|---|---|---|
| P0<br>500 W | 0 c/kWh | 0 c/kWh | 0 c/kWh |
| P1<br>1000 W | 20 c/kWh | 20 c/kWh | 20 c/kWh |
| P2<br>3000 W, | 30 c/kWh | 30 c/kWh | 30 c/kWh | from the following supplied power

| Calculation | P0<br>[W] | Absolute<br>costs for<br>P0<br>[c/kWh] | P1<br>[W] | Absolute<br>costs for<br>P1<br>[c/kWh] | P2<br>[W] | Absolute<br>costs for<br>P2<br>[c/kWh] |
|---|---|---|---|---|---|---|
| R1 | 500 | 0 | 1000 | 20 | 3000 | 30 |
| R2 | 500 | 0 | 1000 | 20 | 3000 | 30, | and from the following calculation (calculation R2):

| Calculation | Total<br>charging power<br>[W] | Translation of<br>absolute total costs<br>[c] | Translation of<br>absolute total costs<br>[c/kWh] |
|---|---|---|---|
| R1 | 3000 | 90 | 30 |
| R2 | 3000 | 70 | 23.33333333 |

In this case, total costs of 3*30c result for a charging operation in which only power above the first power level P1 up to a total charging power of 3000 W is obtained (compare calculation R1). In this case, the relative costs are always 100% of the maximum costs of 30c. In contrast, however, only costs of 1*0c+0.5*20c+2*30c, or relative costs of 0%, 66% and 100% of the maximum costs of 30c in the respective period, would arise if power up to the first power level P0 were obtained in one period, if power of between the first power level P0 and the second power level P1 were obtained in a further period and if power above the first power level P1 were obtained in yet another period.

This can be observed, in particular, in winter or in the case of solar installations having a lower performance, in the case of which the vehicle 1 does not take these cost differences into account since the lower first power levels P0, P1 are below the minimum power characteristic value LK_min.

According to the International Electrotechnical Commission (IEC), a minimum charging current without intelligent communication is approximately 6 A for a PWM value of 10%. For a PWM value of 5%, so-called "high-level" communication, as in ISO15118-2:2014, is explicitly assumed. In ISO, it is possible to specify a minimum charging current which, in principle, may also be lower than 6 A. However, here there are often restrictions in power electronics of the vehicle which make a minimum charging current of approximately 6 A necessary, for example. In this context, it may be useful to specify this minimum charging current in ISO, but the power electronics of the vehicle or other factors are the restrictive factor here.

The fact that the vehicle 1 does not take into account the above-mentioned cost differences is also substantiated by the fact that the minimum charging power of the vehicle 1 according to IEC61851-1 (this is, in particular, edition 2.0 dated November 2010 with the title "Electric vehicle conductive charging system—Part 1: General requirements") with a minimum charging current of 6 A at approximately 230 V is approximately 1380 W. In this case, although favorable charging slots of below 1000 W are transmitted to the vehicle 1, the relative costs are always 100% for power levels above this.

More intelligent translation is intended to solve this problem. In a first exemplary embodiment, the translation is carried out with a combination of the extrapolation of cost components, that is to say first assessment characteristic values K, to the minimum power characteristic value LK_min and the unchanged relative cost components or first assessment characteristic values K for the respective first power levels P0, . . . , P3 which exceed the minimum power characteristic value LK_min.

For this purpose, the program is continued in a step S3 after the first step S1.

A temporary matrix T is determined in step S3. In the first exemplary embodiment, only the costs up to the minimum power characteristic value LK_min are extrapolated in this case. Above this, the relative costs of the additional power are retained by translating them, on a 1:1 basis, into corresponding consumption levels, so-called "consumption slots". Therefore, although the costs do not correspond to reality, they are used as an abstract indicator of the sequence of the most favorable consumption levels.

In other words, a lowest power level of a temporary matrix T is determined in the first exemplary embodiment. In this case, a respective entry in the temporary matrix T for the lowest power level is determined for each first period t0, . . . , t7 of the first assessment matrix KM on the basis of the first assessment characteristic values K of all first power levels P0, P1, P2, P3 below the minimum power characteristic value LK_min of the respective first period t0, . . . , t7. A mean value of the respective assessment characteristic values K is used for this purpose and/or an interpolation is carried out, for example.

For example, in a first assessment matrix KM, the costs up to P0=500 W are 0c, the costs up to P1=1500 W are 10c and the costs up to P3=above are 20c. The minimum power characteristic value LK_min of the vehicle 1 is 1000 W, for example. Consequently, a range of 0 W-1000 W results as the lowest power level of the temporary matrix T. The absolute costs of the lowest power level of the temporary matrix T are therefore 1*0c+1*10c in this case if 500 W at 0c are initially obtained at the first power level P0 and 500 W at 10c are then obtained at the first power level P1. The relative costs of the lowest power level of the temporary matrix T are then 25% of the maximum costs of 20c.

The further power levels of the temporary matrix T are substantially retained from the first assessment matrix KM or result from the extrapolation. The absolute and relative costs of a next power level of the temporary matrix T between 1000 W and 1500 W are therefore still 10c and 50% of the maximum costs of 20c, respectively, and those of the last power level of the temporary matrix T above 1500 W are 20c and 100% of the maximum costs of 20c, respectively.

Alternatively, a buffer area corresponding to a possible next PWM value can also be added to the lowest power level, with the result that it is 10% above the minimum power characteristic value LK_min provided, for example.

In the first exemplary embodiment, the translation is restricted, for example, to the described extrapolation of the costs up to the minimum power characteristic value LK_min. In this case, the program is continued in step S15 after step S3. In the further exemplary embodiments described as follows, the program is continued, however, in a step S5 after step S3. In further exemplary embodiments, the program can also be continued in a step S7 after step S3.

Further entries in the temporary matrix T are determined in step S5. For example, a highest power level of the temporary matrix T is determined on the basis of the maximum power characteristic value LK_max. For each first period t0, . . . , t7 of the first assessment matrix KM, a respective entry in the temporary matrix T for the highest power level is then determined on the basis of the first assessment characteristic values K of all first power levels P0, P1, P2, P3 above the maximum power characteristic value LK_max of the respective first period t0, . . . , t7.

In a second exemplary embodiment, the translation is such that the first assessment characteristic values K of the first assessment matrix KM and therefore tariff information are deliberately subjected to lossy compression by rejecting first power levels P0, . . . , P3 which exceed a maximum charging power of the vehicle 1, that is to say, in particular, first power levels above the maximum power characteristic value LK_max. This reduces a calculation complexity for subsequent method steps for further improving the translation. This may also already possibly make it possible for a number of power levels of the temporary matrix T to be less than or equal to the maximum power level characteristic value LKA_max.

The program is then continued in step S7.

In a third exemplary embodiment, as an alternative or in addition to the procedure according to the first and/or second exemplary embodiment, the translation is such that, in the case of an excessively large number of first periods t0, . . . , t7 of the first assessment matrix KM (also referred to as time slots below) and therefore of the previously determined temporary matrix T, the time slots are combined in a second assessment matrix KM' in such a manner that the vehicle 1 can calculate a charging profile which is improved with respect to the costs and would correspond, as far as possible, to a charging profile which would be calculated by the vehicle 1 with knowledge of all time slot information, that is to say in the event of the vehicle being provided with the first assessment matrix KM, for example.

For this purpose, a check is carried out in step S7 in order to determine whether a number of periods of the temporary matrix T is less than or equal to the maximum period characteristic value tA_max. If the number of periods corresponds to a value greater than the maximum period characteristic value tA_max, the program is continued in a step S9. Otherwise, the program is continued in a step S11.

In step S9, a respective mean value is formed for each combinable block with respect to a power level of adjacent entries in the temporary matrix T. A lowest mean value is then determined and the block of entries in the temporary matrix T corresponding to the respective lowest mean value is combined. In this case, the entries in the temporary matrix T which are assigned to the block are replaced with a single entry comprising the respective lowest mean value. The program is then continued in step S7. In step S11, a check is carried out in order to determine whether a number of power levels of the temporary matrix T is less than or equal to the maximum power level characteristic value LKA. If the number of power levels corresponds to a value greater than the maximum power level characteristic value LKA, the program is continued in a step S13. Otherwise, the program is continued in a step S15.

In step S13, a respective mean value is formed for each combinable block with respect to a period of adjacent entries in the temporary matrix T. A lowest mean value is then determined and the block of entries in the temporary matrix T corresponding to the respective lowest mean value is combined. In this case, the entries in the temporary matrix T which are assigned to the block are replaced with a single entry comprising the respective lowest mean value. The program is then continued in step S11.

In a first embodiment variant, respectively adjacent time slots could be combined according to steps S7 to S13 until a number of remaining time slots is less than or equal to the maximum period characteristic value tA_max, for example 1024 (maximum number of ISO slots). However, very favorable slots could be rendered unrecognizable by adjacent very expensive slots.

In a second embodiment variant, the most favorable adjacent slots are alternatively initially linked to one another in steps S7 to S13. If favorable and expensive slots alternately occur in the extreme case, slots are not combined. Based on a combination of the first and second exemplary embodiments, the procedure is therefore as follows:

In a first step of the second embodiment variant, price/power intersections are optionally first of all introduced wherever the neighboring time slots have a break, with the result that distortion of the calculation can be avoided. The following table is used as an example, in which two SEMP time slots each with three price/power slots, that is to say first assessment characteristic values K, are translated into ISO.

| Power range [W] | SEMP costs at t0 [c/kWh] | SEMP costs at t1 [c/kWh] | -> | ISO relative costs at t0 | ISO relative costs at t1 |
|---|---|---|---|---|---|
| 3000 <= x < 4000 | 100 | 100 | | 0.425 | 0.6 |
| 2000 <= x < 3000 | 35 | | | 0.2333 | |
| 1000 <= x < 2000 | | 40 | | | 0.2 |
| 0 <= x < 1000 | 0 | 0 | | 0 | 0 |

In order to initially keep things simple, it is assumed in this case that the minimum power characteristic value LK_min of the vehicle 1 is less than 1000 W. In this case, the relative costs are determined on the basis of the upper power limit:

It can be seen from the example above that the time slot around t1 appears to be more favorable for a power of 1500 W, for example. This is actually not the case. This is due to the fact that the time slots contain SEMP price/power slot costs for different powers. This problem can be resolved by determining the costs for all power levels. In order to avoid excessive power fragmentation, useful minimum power differences which, in the worst-case scenario, enable only a slight real cost deviation can be taken into account here. For example, a minimum difference could be at 100 W or could be at a useful value according to a predefined range of values (for example on the basis of a specification). In that example, the following result would be calculated here:

| Power range [W] | SEMP costs at t0 [c/kWh] | SEMP costs at t1 [c/kWh] | -> | ISO relative costs at t0 | ISO relative costs at t1 |
|---|---|---|---|---|---|
| 3000 <= x < 4000 | 100 | 100 | | 0.425 | 0.6 |
| 2000 <= x < 3000 | 35 | | | 0.2333 | 0.4666 |
| 1000 <= x < 2000 | | 40 | | 0.175 | 0.2 |
| 0 <= x < 1000 | 0 | 0 | | 0 | 0 |

On account of the fact that the algorithm has generated additional consumption slots in the above example in order to be able to better compare adjacent slots, the actually more favorable slot around t0 would now be initially possible for a power of 1500 W.

With regard to the specifications according to ISO, unfortunately more consumption slots than are allowed in the specifications according to ISO in turn certainly arise therefrom. Subsequent compression is described in the following steps.

In a second step of the second embodiment variant, time slot compression is carried out until no time slot comprises more than 3 power/cost gradations for each slot and at least one of the following conditions is satisfied:

the respective power/cost gradations are representative of energy corresponding to a required amount of energy of the vehicle 1; or the maximum period characteristic value tA_max or the maximum ISO number of time slots of 1024 has been reached or undershot; or no more slots can be combined, that is to say the number of slots corresponds to the value 1.

In a third step of the second embodiment variant, the most cost-effective slots and layers are first of all searched for and the method is continued from there with the most favorable adjacent slots. However, adjacent time slots should be linked to one another only when the maximum period characteristic value tA_max, that is to say the maximum number of possible time slots, is still exceeded or when the energy required by the vehicle 1 has not yet been achieved with the new compressed slot.

In a fourth step of the second embodiment variant, the slots are compressed in such a manner that the next most favorable slots which can be combined to form a block are selected on arithmetic average.

In a fifth step of the second embodiment variant, after the required energy requirement has been reached, the compression is also then continued until the maximum number of ISO slots has been reached. In this case, slots which have already been combined remain unaffected.

Instead, the method continues with the most favorable slots and new blocks of slots are generated. These could then be considered to be completed again when a predefined threshold value of 100 Wh, for example, is reached, and the method continues again with the most favorable slots.

In a sixth step of the second embodiment variant, after the maximum number of ISO time slots has been complied with, only power blocks toward the top are compressed until the energy required by the vehicle 1 is covered. After the energy required by the vehicle 1 has been reached, slots which have already been combined remain unaffected. Instead, the method continues with the most favorable slots and new blocks of consumption slots are generated.

Compression of an exemplary first assessment matrix KM with relative costs in a plurality of steps is illustrated below.

| Power range [W] | KM relative costs at t0 [c/kWh] | KM relative costs at t1 [c/kWh] | KM relative costs at t2 [c/kWh] | KM relative costs at t3 [c/kWh] | KM relative costs at t4 [c/kWh] | KM relative costs at t5 [c/kWh] | KM relative costs at t6 [c/kWh] | KM relative costs at t7 [c/kWh] |
|---|---|---|---|---|---|---|---|---|
| P3 = 3700 | 9 | 9 | 1 | 2 | 5 | 6 | 2 | 2 |
| P2 = 2500 | 1 | 0 | 1 | 2 | 5 | 6 | 2 | 2 |
| P1 = 2000 | 1 | 0 | 1 | 1 | 1 | 1 | 2 | 0 |
| P0 = 1500 | 0 | 0 | 1 | 1 | 0 | 1 | 2 | 0 |

In a first step, a temporary matrix T is created from the first assessment matrix. In this case, the lowest power level of the temporary matrix T is already above the minimum power characteristic value LK_min. In a first step of the compression, the relative costs of the two first power levels P0, P1 of the first period t7 are combined, for example:

| Power range [W] | T relative costs at t0 [c/kWh] | T relative costs at t1 [c/kWh] | T relative costs at t2 [c/kWh] | T relative costs at t3 [c/kWh] | T relative costs at t4 [c/kWh] | T relative costs at t5 [c/kWh] | T relative costs at t6 [c/kWh] | T relative costs at t7 [c/kWh] |
|---|---|---|---|---|---|---|---|---|
| P3 = 3700 | 9 | 9 | 1 | 2 | 5 | 6 | 2 | 2 |
| P2 = 2500 | 1 | 0 | 1 | 2 | 5 | 6 | 2 | 2 |
| P1 = 2000 | 1 | 0 | 1 | 1 | 1 | 1 | 2 | 0 |
| P0 = 1500 | 0 | 0 | 1 | 1 | 0 | 1 | 2 | |

In a further step of the compression, the relative costs of the periods t0, t1 of the power level P0 are combined, for example:

| Power range [W] | T relative costs at t0 [c/kWh] | T relative costs at t1 [c/kWh] | T relative costs at t2 [c/kWh] | T relative costs at t3 [c/kWh] | T relative costs at t4 [c/kWh] | T relative costs at t5 [c/kWh] | T relative costs at t6 [c/kWh] | T relative costs at t7 [c/kWh] |
|---|---|---|---|---|---|---|---|---|
| P3 = 3700 | 9 | 9 | 1 | 2 | 5 | 6 | 2 | 2 |
| P2 = 2500 | 1 | 0 | 1 | 2 | 5 | 6 | 2 | 2 |
| P1 = 2000 | 1 | 0 | 1 | 1 | 1 | 1 | 2 | 0 |
| P0 = 1500 | 0 | | 1 | 1 | 0 | 1 | 2 | |

In a further step of the compression, the relative costs of the periods t0, t1 of the power levels P0, P1 are combined, for example:

| Power range [W] | T relative costs at t0 [c/kWh] | T relative costs at t1 [c/kWh] | T relative costs at t2 [c/kWh] | T relative costs at t3 [c/kWh] | T relative costs at t4 [c/kWh] | T relative costs at t5 [c/kWh] | T relative costs at t6 [c/kWh] | T relative costs at t7 [c/kWh] |
|---|---|---|---|---|---|---|---|---|
| P3 = 3700 | 9 | 9 | 1 | 2 | 5 | 6 | 2 | 2 |
| P2 = 2500 | 1 | 0 | 1 | 2 | 5 | 6 | 2 | 2 |
| P1 = 2000 | | 1/4 | 1 | 1 | 1 | 1 | 2 | 0 |
| P0 = 1500 | | | 1 | 1 | 0 | 1 | 2 | |

In a further step of the compression, the relative costs of the periods t0, t1 of the power levels P0, P1, P2 are combined, for example:

| Power range [W] | T relative costs at t0 [c/kWh] | T relative costs at t1 [c/kWh] | T relative costs at t2 [c/kWh] | T relative costs at t3 [c/kWh] | T relative costs at t4 [c/kWh] | T relative costs at t5 [c/kWh] | T relative costs at t6 [c/kWh] | T relative costs at t7 [c/kWh] |
| --- | --- | --- | --- | --- | --- | --- | --- | --- |
| P3 = 3700 | 9 | 9 | 1 | 2 | 5 | 6 | 2 | 2 |
| P2 = 2500 |   | 1/3 | 1 | 2 | 5 | 6 | 2 | 2 |
| P1 = 2000 |   |   | 1 | 1 | 1 | 1 | 2 | 0 |
| P0 = 1500 |   |   | 1 | 1 | 0 |   | 1 | 2 |

In a further step of the compression, the relative costs of the periods t4, t5 of the power level P0 are combined, for example:

| Power range [W] | T relative costs at t0 [c/kWh] | T relative costs at t1 [c/kWh] | T relative costs at t2 [c/kWh] | T relative costs at t3 [c/kWh] | T relative costs at t4 [c/kWh] | T relative costs at t5 [c/kWh] | T relative costs at t6 [c/kWh] | T relative costs at t7 [c/kWh] |
| --- | --- | --- | --- | --- | --- | --- | --- | --- |
| P3 = 3700 | 9 | 9 | 1 | 2 | 5 | 6 | 2 | 2 |
| P2 = 2500 |   | 1/3 | 1 | 2 | 5 | 6 | 2 | 2 |
| P1 = 2000 |   |   | 1 | 1 | 1 | 1 | 2 | 0 |
| P0 = 1500 |   |   | 1 | 1 | 1/2 |   | 2 |   |

In a further step of the compression, the relative costs of the periods t3, t4, t5 of the power level P0 are combined, for example:

| Power range [W] | T relative costs at t0 [c/kWh] | T relative costs at t1 [c/kWh] | T relative costs at t2 [c/kWh] | T relative costs at t3 [c/kWh] | T relative costs at t4 [c/kWh] | T relative costs at t5 [c/kWh] | T relative costs at t6 [c/kWh] | T relative costs at t7 [c/kWh] |
| --- | --- | --- | --- | --- | --- | --- | --- | --- |
| 3700 | 9 | 9 | 1 | 2 | 5 | 6 | 2 | 2 |
| 2500 |   | 1/3 | 1 | 2 | 5 | 6 | 2 | 2 |
| 2000 |   |   | 1 | 1 | 1 | 1 | 2 | 0 |
| 1500 |   |   | 1 |   | 2/3 |   | 2 |   |

In a further step of the compression, the relative costs of the periods t0, t1, t2 of the power levels P0, P1, P2 are combined, for example:

| Power range [W] | T relative costs at t0 [c/kWh] | T relative costs at t1 [c/kWh] | T relative costs at t2 [c/kWh] | T relative costs at t3 [c/kWh] | T relative costs at t4 [c/kWh] | T relative costs at t5 [c/kWh] | T relative costs at t6 [c/kWh] | T relative costs at t7 [c/kWh] |
| --- | --- | --- | --- | --- | --- | --- | --- | --- |
| 3700 | 9 | 9 | 1 | 2 | 5 | 6 | 2 | 2 |
| 2500 |   | 5/9 |   | 2 | 5 | 6 | 2 | 2 |
| 2000 |   |   |   | 1 | 1 | 1 | 2 | 0 |
| 1500 |   |   |   |   | 2/3 |   | 2 |   |

In a further step of the compression, the relative costs of the periods t3, t4, t5 of the power levels P0, P1 are combined, for example. The temporary matrix T then corresponds to the second assessment matrix KM', for example:

| Power range [W] | KM' relative costs at t0 [c/kWh] | KM' relative costs at t1 [c/kWh] | KM' relative costs at t2 [c/kWh] | KM' relative costs at t3 [c/kWh] | KM' relative costs at t4 [c/kWh] | KM' relative costs at t5 [c/kWh] | KM' relative costs at t6 [c/kWh] | KM' relative costs at t7 [c/kWh] |
|---|---|---|---|---|---|---|---|---|
| P3 = 3700 | 9 | 9 | 1 | 2 | 5 | 6 | 2 | 2 |
| P2 = 2500 |  | 5/9 |  | 2 | 5 | 6 | 2 | 2 |
| P1 = 2000 |  |  |  |  | 2/3 |  | 2 | 0 |
| P0 = 1500 |  |  |  |  |  |  | 2 |  |

In step S15, the vehicle 1 is provided with the second assessment matrix KM'. The program is then ended, for example.

The described translation advantageously enables intelligent translation of different application protocols, in particular into ISO, which contribute to an improved charging profile of the vehicle 1. The vehicle 1 can determine the charging profile from the second assessment matrix KM'.

FIG. 3 shows, by way of example, a first assessment matrix KM having first periods t0, . . . , t7, first power levels P0, . . . P3 and first assessment characteristic values K as well as a second assessment matrix KM' having second periods t0', . . . , t2', second power levels P0, . . . P2 and second assessment characteristic values K' after translation.

LIST OF REFERENCE SYMBOLS

1 Vehicle
3 Charging station
5 Energy management unit
7 Translation unit
8 Energy supply unit
9 Energy store
31, 35 Energy interface
71, 75 Communication interface
100 System
KM, KM' Assessment matrix
T Temporary matrix
K, K' Assessment characteristic value
LK_min Minimum power characteristic value
LK_Max Maximum power characteristic value
t0, . . . , t7, t0', . . . , t2' Period
P0, . . . P3, P0', . . . P2' Power level
tA_max Maximum period characteristic value
LKA_max Maximum power level characteristic value
S1 . . . S15 Program steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a system for supplying a vehicle with electrical energy, the system comprising:
   a charging station,
   an energy management unit, and
   a translation unit having a first communication interface for communicating with the energy management unit and a second communication interface which is couplable to the vehicle for purpose of communication, in which case, if the vehicle is coupled to the second communication interface; the method for operating the system comprises the steps of:
   providing the system with a minimum power characteristic value (LK_min) representative of a minimum electrical power which can be supplied to the vehicle;
   providing the translation unit, via the first communication interface, with a first assessment matrix (KM) which comprises a first assessment characteristic value (K) for each period of future first periods (t0, t1, t2, t3, t4, t5, t6, t7) and for each power level of first power levels (P0, P1, P2, P3) of electrical power to be supplied by the system, which assessment characteristic value is representative of an outlay associated with supplying the respective electrical power for the respective first period,
   determining, via the translation unit, a second assessment matrix (KM'), which is representative of an estimate of the outlay, on the basis of the minimum power characteristic value (LK_min) and the first assessment matrix (KM), and
   providing the vehicle with the second assessment matrix (KM') via the second communication interface.

2. A method for operating a system for supplying a vehicle with electrical energy, the system comprising:
   a charging station,
   an energy management unit, and
   a translation unit having a first communication interface for communicating with the energy management unit and a second communication interface which is couplable to the vehicle for purpose of communication, in which case, if the vehicle is coupled to the second communication interface; the method for operating the system comprises the steps of:
   providing the system with a minimum power characteristic value (LK_min) representative of a minimum electrical power which can be supplied to the vehicle;
   providing the translation unit, via the first communication interface, with a first assessment matrix (KM) which comprises a first assessment characteristic value (K) for each period of future first periods (t0, t1, t2, t3, t4, t5, t6, t7) and for each power level of first power levels (P0, P1, P2, P3) of electrical power to be supplied by the system, which assessment characteristic value is representative of an outlay associated with supplying the respective electrical power for the respective first period,
   determining, via the translation unit, a second assessment matrix (KM'), which is representative of an estimate of the outlay, on the basis of the minimum power characteristic value (LK_min) and the first assessment matrix (KM), and
   providing the vehicle with the second assessment matrix (KM') via the second communication interface,
   wherein
   a process of determining the second assessment matrix (KM') comprises a process of determining a temporary matrix (T), in which case a lowest power level of the temporary matrix (T) is determined on the basis of the minimum power characteristic value (LK_min), and for each first period (t0, . . . , t7) of the first assessment matrix (KM), a respective entry in the temporary matrix (T) for the lowest power level is determined on the basis of the first assessment characteristic values (K) of all first power levels (P0, P1, P2, P3) below the minimum power characteristic value (LM_min) of the respective first period (t0, . . . , t7).

3. The method as claimed in claim 2, further comprising the steps of:

providing the system with a maximum power characteristic value (LK_max) representative of a maximum electrical power which can be received by the vehicle, determining a highest power level of the temporary matrix (T) on the basis of the maximum power characteristic value (LK_max), and for each first period (t0, . . . , t7) of the first assessment matrix (KM), determining a respective entry in the temporary matrix (T) for the highest power level on the basis of the first assessment characteristic values (K) of all first power levels (P0, P1, P2, P3) above the maximum power characteristic value (LK_max) of the respective first period (t0, . . . , t7).

4. The method as claimed in claim 3, wherein respectively adjacent entries in the temporary matrix (T) are iteratively combined in blocks until a first and/or a second abort criterion is/are reached.

5. The method as claimed in claim 2, wherein respectively adjacent entries in the temporary matrix (T) are iteratively combined in blocks until a first and/or a second abort criterion is/are reached.

6. The method as claimed in claim 4, further comprising the steps of:

providing the translation unit with a maximum power level characteristic value (LKA_max), for each iteration, a check is carried out, as a first abort criterion, in order to determine whether a number of power levels for each period is less than or equal to the maximum power level characteristic value (LKA_max), and otherwise:

a respective mean value is formed for each combinable block with respect to a period of adjacent entries in the temporary matrix (T), a lowest mean value is determined for each iteration, in which case the block of entries in the temporary matrix (T) corresponding to the respective lowest mean value is combined by replacing the entries in the temporary matrix (T) which are assigned to the block with a single entry comprising the respective lowest mean value.

7. The method as claimed in claim 5, further comprising the steps of:

providing the translation unit with a maximum power level characteristic value (LKA_max), for each iteration, a check is carried out, as a first abort criterion, in order to determine whether a number of power levels for each period is less than or equal to the maximum power level characteristic value (LKA_max), and otherwise:

a respective mean value is formed for each combinable block with respect to a period of adjacent entries in the temporary matrix (T), a lowest mean value is determined for each iteration, in which case the block of entries in the temporary matrix (T) corresponding to the respective lowest mean value is combined by replacing the entries in the temporary matrix (T) which are assigned to the block with a single entry comprising the respective lowest mean value.

8. The method as claimed in claim 4, further comprising the steps of:

providing the translation unit with a maximum period characteristic value (tA_max), for each iteration, a check is carried out, as a second abort criterion, in order to determine whether a number of periods for each power level is less than or equal to the maximum period characteristic value (tA_max), and otherwise:

a respective mean value is formed for each combinable block with respect to a power level of adjacent entries in the temporary matrix (T), a lowest mean value is determined for each iteration, in which case the block of entries in the temporary matrix (T) corresponding to the respective lowest mean value is combined by replacing the entries in the temporary matrix (T) which are assigned to the block with a single entry comprising the respective lowest mean value.

9. The method as claimed in claim 6, further comprising the steps of:

providing the translation unit with a maximum period characteristic value (tA_max), for each iteration, a check is carried out, as a second abort criterion, in order to determine whether a number of periods for each power level is less than or equal to the maximum period characteristic value (tA_max), and otherwise:

a respective mean value is formed for each combinable block with respect to a power level of adjacent entries in the temporary matrix (T), a lowest mean value is determined for each iteration, in which case the block of entries in the temporary matrix (T) corresponding to the respective lowest mean value is combined by replacing the entries in the temporary matrix (T) which are assigned to the block with a single entry comprising the respective lowest mean value.

10. The method as claimed in claim 1, wherein the first communication interface is operated according to the SEMP protocol.

11. The method as claimed in claim 10, wherein the second communication interface is operated according to the protocol in accordance with ISO15118-2:2014.

12. The method as claimed in claim 1, wherein the second communication interface is operated according to the protocol in accordance with ISO15118-2:2014.

13. A system for supplying a vehicle with electrical energy, comprising:

a charging station having a first energy interface which is couplable to the vehicle for supplying the vehicle with electrical energy;

an energy management unit having a second energy interface for supplying the charging station with electrical energy; and a translation unit having a first communication interface for communicating with the energy management unit and a second communication interface which is couplable to the vehicle for communication, the system being operatively configured to:

receive a minimum power characteristic valve (LK_min) representative of a minimum electrical power suppliable to the vehicle, provide the translation unit, via the first communication interface, with a first assessment matrix (KM) which comprises a first assessment characteristic value (K) for each period of future first periods (t0, t1, t2, t3, t4, t5, t6, t7) and for each power level of first power levels (P0, P1, P2, P3) of electrical power to be supplied by the system, which assessment characteristic value is representative of an outlay associated with supplying the respective electrical power for the respective first period, determine, via the translation unit, a second assessment matrix (KM'), which is representative of an estimate of the outlay, on the basis of the minimum power characteristic value (LK_min) and the first assessment matrix (KM), and provide the vehicle with the second assessment matrix (KM') via the second communication interface, wherein the determining of the second assessment matrix comprises determining a temporary matrix, in which case a lowest power level of the temporary matrix is determined based on the minimum power characteristic value, and for each first period of the first assessment matrix, a respective entry in the temporary matrix for the lowest power level is determined based on the first assessment characteristic values of all first power levels below the minimum power characteristic value of the respective first period.

14. The system as claimed in claim 13, wherein
the energy management unit is a home energy management system.

15. The system as claimed in claim 14, wherein
the energy management unit is assigned a decentralized energy supply unit and/or a stationary energy store.

16. The system as claimed in claim 13, wherein
the energy management unit is assigned a decentralized energy supply unit and/or a stationary energy store.

* * * * *